United States Patent Office

3,179,642
Patented Apr. 20, 1965

3,179,642
REMOVAL OF SOLVENT FROM SOLVENT POLYMER SYSTEMS
Emmerich Pflegerl and Wilhelm Schanzer, Marl, Kreis Recklinghausen, Germany, assignors to Chemische Werke Huls, Aktiengesellschaft, Marl, Kreis Recklinghausen, Germany
Filed Nov. 30, 1961, Ser. No. 156,078
14 Claims. (Cl. 260—88.2)

This invention relates to a method and apparatus for the removal of solvents from solvent-polymer systems, particularly from organic solutions of polymers.

It is known that solutions of high polymer hydrocarbons which are obtained by free radical or ionic polymerization of polymerizable hydrocarbons, such as dienes, for example, butadiene and isoprene, and mono-olefins, such as propylene, butylene, propylene-ethylene mixtures, butylene-ethylene mixtures, and propylene-butylene mixtures, as well as mixtures of dienes and mono-olefins can be produced with the aid of catalysts or mixed catalysts obtained from metallorganic compounds in the presence of organic solvents. By adding another organic liquid which does not dissolve the high polymer hydrocarbons, the polymer is precipitated from the solution, and the polymer is then washed and dried. This procedure is costly since great amounts of precipitating non-solvents are required which must be regenerated, and the use of these organic non-solvents also necessitates meticulous safety measures.

As an attempt to circumvent the difficulties inherent in the use of organic non-solvents, it has been suggested in the art to disperse the polymeric solution in hot water, and then to remove the solvent from these dispersions, possibly by an additional treatment with steam. This method is unsatisfactory because the solutions of high polymer hydrocarbons pass through a highly viscous sticky intermediate state in the process of removing the solvents, thereby necessitating additional steps in order to redisintegrate or free the polymer particles which, in the absence of these steps, coagulate and form lumps during the intermediate stage.

An object of this invention, therefore, is to provide a simple and inexpensive process for eliminating solvents from solvent-polymer systems, particularly from organic solutions of polymers.

Another object is to provide apparatus for conducting the process of this invention.

Still other objects and advantages of this invention will become apparent upon further study of the specification and appended claims.

To accomplish the objects of this invention, reference is directed to accompanying drawings wherein—

Figure 1:
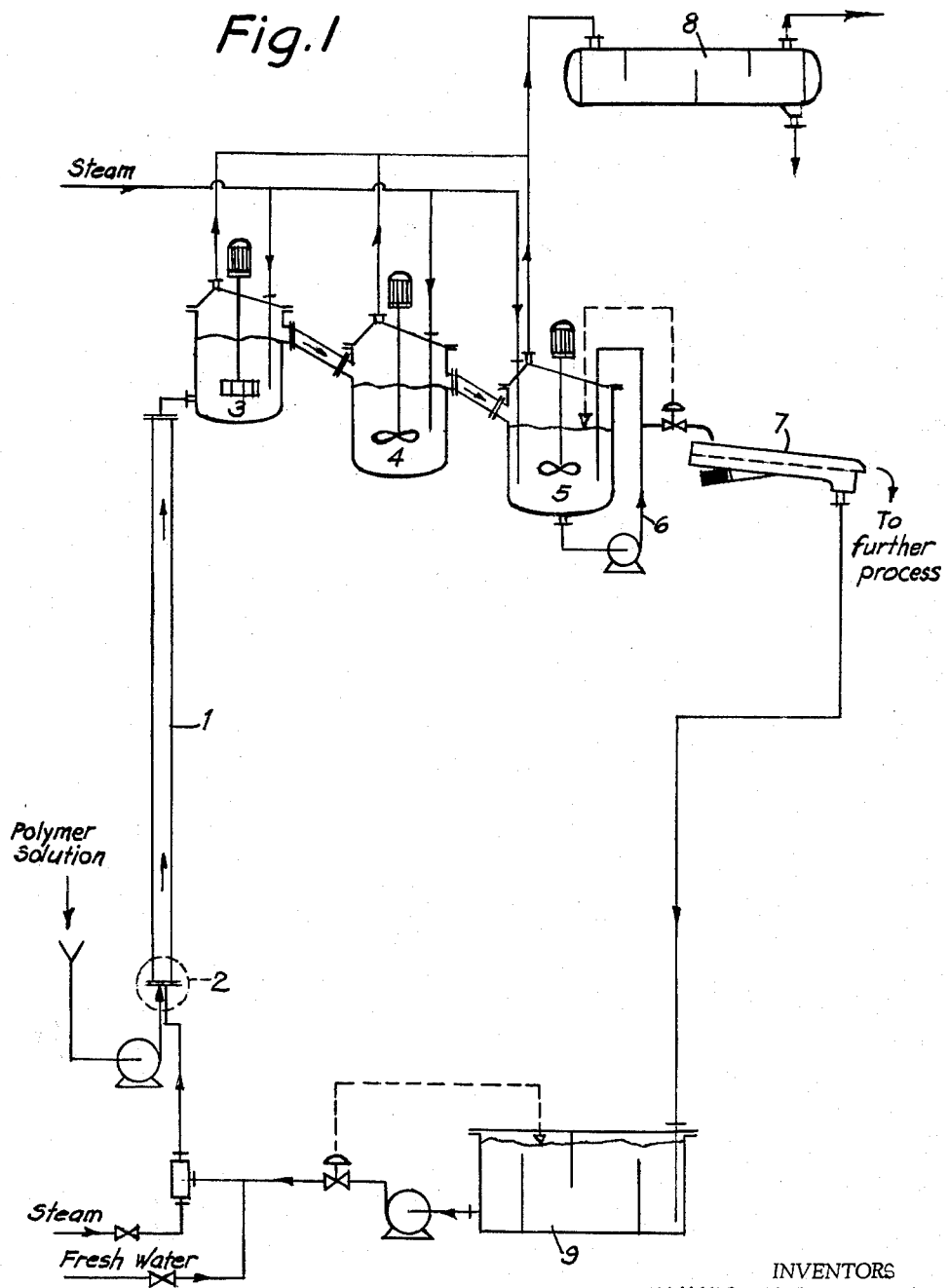
Figure 2:
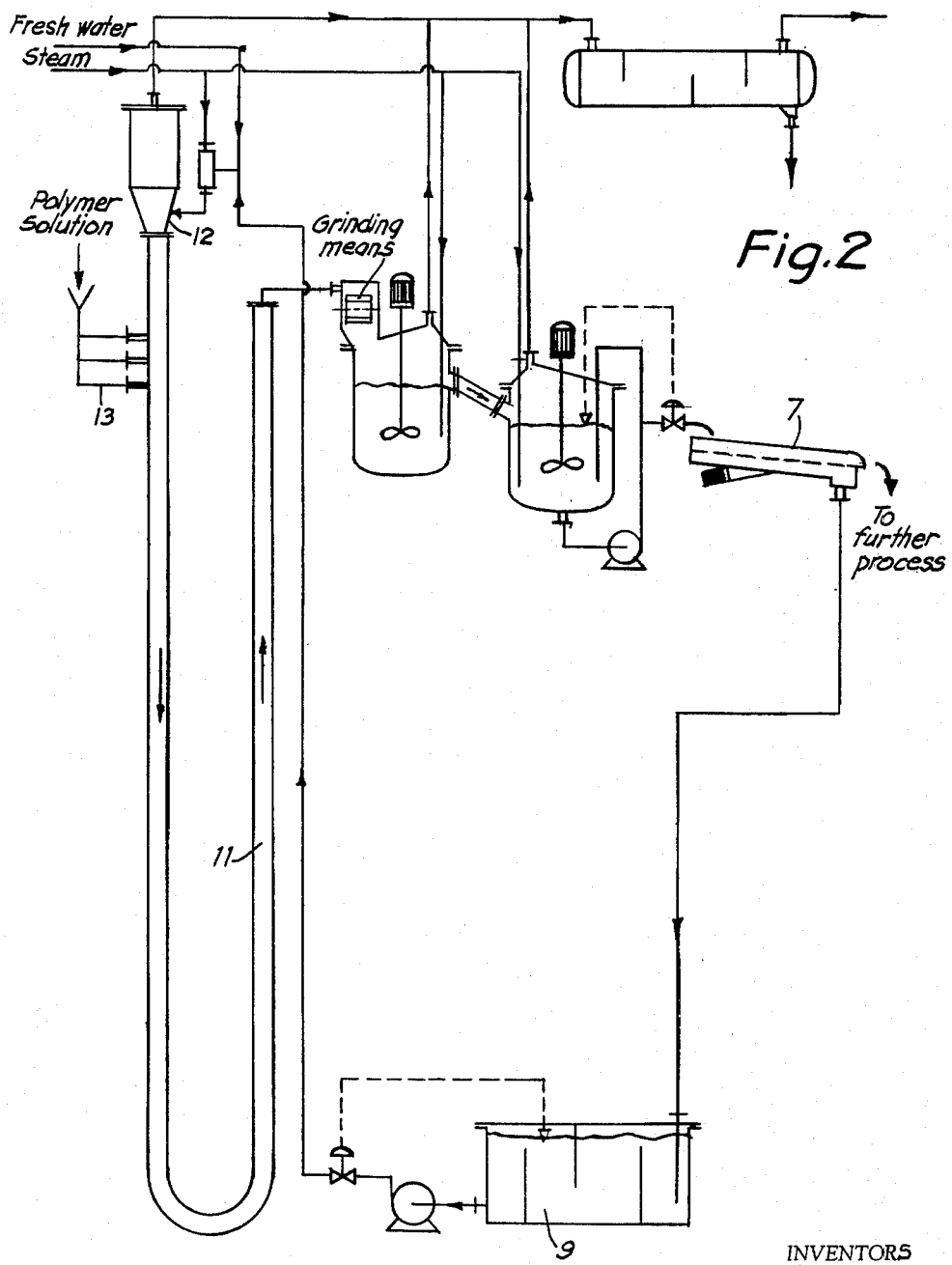

FIGURE 1 is detailed diagrammatic flow sheet of the process of the invention; and FIGURE 2 is detailed diagrammatic flow sheet of a preferred embodiment of the process of the invention.

It has now been found that organic solutions of polymers can be treated so that the polymers can be recovered without the use of organic non-solvents, and of most importance, without the polymer becoming sticky or coagulating into large particles. This is accomplished by evaporating the solvent in an aqueous dispersion, in such a way that the organic solutions and the hot water are passed through a vertical column, whereupon the resulting mixture is removed at the end of the tube, and the polymer contained therein is washed and dried in a conventional manner. The advantage of the vertical column is that back-mixing of solvent-freed polymer and fresh solutions of polymer is kept to a minimum, thereby reducing if not completely eliminating coagulation.

Referring to the drawings is detail, FIGURE 1 shows an apparatus utilizing a simple vertical column. Hot water and the polymeric solutions are introduced at the bottom of column 1. By a filter plate or nozzle disposed at the bottom 2, the polymeric solutions are dispersed, thereby producing a high surface mass ratio and resulting in a faster rate of heat exchange. In said column, a significant separation of the granular polymer and solvent vapor takes place, i.e. 85 to 95% of the initial solvent is removed from the solution, the rest remaining in the polymeric granules emerging from the upper part of the column and eventually being vaporized in one of the agitated washing vessels 3, 4, 5, arranged in series. The agitator is designed so that the polymer entering vessel 3 is agitated to such an extent that uniform evaporation is accomplished in the shortest possible time. The recycle circuit 6 is associated with the last vessel so that there is a partial but continuous flow of aqueous mixture of polymer to the vibration screen 7 whereafter the polymers are further drained, comminuted (if necessary) and dried according to conventional methods. The solvent and water vapors from the agitated vessels are condensed in a condenser 8 and separated thereafter. The hot water draining from the vibration screen 7 is freed from entrained polymer particles in the settling tank 9 and is then recycled to the column. Makeup water is supplied by fresh water.

A second embodiment of the device is illustrated in FIGURE 2. A vertically disposed U-tube is utilized instead of a simple column. The hot water is introduced at 12, the polymer solution at 13. In contrast to column operation, the polymer particles and solvent vapors are diffused countercurrently not cocurrently. An advantage of countercurrent operation is based on the fact that, in case of sudden increased load there will not be a vapor lock in the U-tube. The other operations in FIGURE 2 are substantially the same as the process described in FIGURE 1.

Although this invention is obviously applicable to all organic solutions of polymers, it is particularly effective for the removal of solvents from high polymer hydrocarbons.

High polymer hydrocarbons within the meaning of this invention, are preferably the polymers of butadiene, isoprene; propylene, butylene, propylene-ethylene copolymers, butylene-ethylene copolymers, propylene-butylene copolymers, as well as copolmers of dienes and mono-olefins. The polymerization of these polymerizable hydrocarbons is effected by catalysts or mixed catalysts containing metallorganic compounds. Suggested as catalysts are, for example, lithium-butyl and the mixed catalysts from compounds of the metals of the 4th through the 6th and 8th sub groups of the Periodic System, commonly called mixed catalysts of low pressure polymerization, especially titanium and cobalt compounds on the one hand, and metallorganic compounds of aluminum, the alkali earth metals, and/or alkali metals on the other hand.

Polymerization of the above-named polymerizable hydrocarbons with the aid of these catalysts in the presence of solvents, such as hexane, cyclohexane, isopropyl cyclohexane, benzene, etc., the mixtures of these hydrocarbons, benzine-fractions, etc., give the polymers in the form of usual viscous solutions. As a rule these solutions contain between 5 and 20, and especially between 5 and 25 percent by weight of high polymer hydrocarbons.

The catalyst residues still present in these solutions are decomposed, possibly prior to removing the solvent, for example, by adding small amounts of alcohol, and are then removed by washing, for example, with alcohol or water. Possibly the removal of the catalyst residues can be dispensed with, as in the course of further processing of the solutions, the catalysts are usually converted into a form which is unharmful and are not deleterious to the properties of the polymers.

As a rule the polymeric organic solutions at 5–60° C., preferably 20–35° C., are passed through nozzle-like openings into hot water, resulting in the dispersion of the solution into small droplets. This step is preferably conducted at a super-atmospheric pressure, usually between 1 and 10, and especially between 2 and 8 atmospheres. The water, should at any rate, be at a temperature above the boiling point of the solvent or above the boiling point of any azeotropic mixture of the water and the solvent. It is preferable that the water be employed at higher temperatures, up to about 115° C., the upper temperatures, of course, being dependent on the temperature-rheological characteristics of the specific polymer treated, and the decomposition temperature of both the polymer and solvent. The temperature at the top of the column is above the boiling point of water-solvent azeotrope, and preferably is higher-up to about 100° C.

The heat content of the water as determined by water temperature and quantity, must be sufficient to evaporate the total quantity of the solvent. In some cases, it can be of advantage to supply additional heat in the form of steam. The rate of flow of the water and the residence time of the mixture in the vertical column must be sufficient as to allow the solvent to diffuse from the droplets of the solution to the surface of the latter and there to evaporate. By simple preliminary tests suitable combinations of residence time and rate of flow can be easily ascertained.

The solvent is evaporated, for example, by introducing the polymeric organic solution and the hot water into the lower part of a vertical column, the length of which is at least five times and advantageously 10 to 250 times its diameter, and to remove the resulting mixture of granular polymer, liquid water, and water and solvent vapors at the upper part of the tube. However, it is also advantageous to use a U-shaped tube, with vertical leg portions, to introduce the solution and the hot water approximately in the upper third of one of the leg portions and then to tap the mixture of granular polymers and water from the upper part of the other leg portion, whereas the vapor mixture of steam and solvent is passed into the uppermost outlet of the feeding leg portion.

The vapors containing the solvents are advantageously condensed, so that by simple decantation the main portion can be easily separated. The polymer can simply be separated and dried, however, since the polymer usually still contains a small amount of solvent, in the order of about 5 percent, it is usually advantageous to wash the polymer once or several times by mechanical agitation with hot water employing vigorous agitation in at least the first washing stages, the granular polymer can also be further reduced in particle size if necessary. The polymer particles are finally separated and dried in a conventional manner.

In the course of the process it is possible to add before, during or after evaporation of the solvents the usual auxiliary agents such as stabilizers, softeners, fillers, dyes, etc.

In order to further illustrate the process of this invention, the following preferred specific embodiments are presented merely as examples and are not limitative of the specification and appended claims.

*Example I*

Into the bottom of vertical column having a diameter of 0.1 m. and a length of 8 m., there is introduced 250 liters per hour of a 13 percent solution of polybutadiene obtained by the employment of a mixed Ziegler catalyst. The catalyst residues have been previously destroyed by adding a small amount of alcohol and also introducing 2 cubic meters per hour of water having a temperature of 100° C. The temperature at the upper end of the tube is 75° C. From the column the mixture passes into a vessel provided with an agitator, said vessel being connected to the column and having a capacity of 0.3 m.³ wherein said mixture is maintained at a temperature of 98° C. under agitation by the injection of steam. The vessel is then continuously tapped, yielding a mixture of solid granular polymer and water. Obtained are 61 kg. per hour of a wet product containing 53.5 percent solids, equivalent equal to 32.6 kg. per hour of polybutadiene. The wet product does not contain more than 0.2 percent benzene.

*Example II*

Into the apparatus used in Example I there are introduced at the bottom 200 liters per hour of a 6.5 percent solution of an ethylene-propylene copolymer in hexane (obtained by polymerization with a Ziegler mixed catalyst in which the residual mixed catalysts have been destroyed by the addition of a small amount of water) and also 1.8 m.³ per hour of 100° C. water. The temperature at the discharge end of the tube is 78° C. After withdrawing the mixture heated to 98° C. by steam injection from the agitated vessel, and after removing the water, there are obtained about 20 kg. per hour of a granular product having a solids content of 65 percent equal to 13 kg. per hour of ethylene-propylene polymers. The product does not contain more than 0.2 percent benzene.

The reason why the process of this invention does not yield sticky polymers is that back mixing between substantially solvent-freed polymer and freshly introduced polymer solution is prevented in said column or U-tube by consequent direct current flow in the column or in the second leg of the U-tube.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What is claimed is:

1. A method of separating a solvent from a solution of an organic solvent and a polymer, which method comprises continuously dispersing said solution into sufficient hot water at a sufficiently high temperature to vaporize said solvent, and simultaneously passing the resultant dispersion upwardly through a column to prevent back mixing between substantially solvent-freed polymer and freshly introduced solution, and withdrawing said substantially solvent-freed polymer from the top of said column whereby said solvent-freed polymer is recovered without passing through a sticky state.

2. The method of claim 1, wherein said polymer is a hydrocarbon polymer and said solvent substantially water-immiscible.

3. The method of claim 1, wherein said polymer is produced by solution polymerization in the presence of a catalyst.

4. The process of claim 3, wherein the catalyst is a Ziegler-type catalyst.

5. A method of separating a solvent from a solution of an organic solvent and a polymer which method comprises continuously dispersing said solution into sufficient hot water at a sufficiently high temperature to vaporize said solvent, simultaneously passing said dispersion downwardly through an upper portion zone of a leg of a vertically disposed U-tube, separating said solvent from solution in said zone, passing said solvent upwardly out said leg of said U-tube, and passing a mixture of water and substantially solvent-freed polymer from said upper portion zone out of the other leg of said U-tube, whereby said solvent-freed polymer is recovered without passing through said sticky state, and whereby said U-tube flow pattern of said solvent, water and polymer avoids vapor lock of said process in case of a sudden increased load.

6. The method of claim 2, wherein said polymer is a hydrocarbon polymer and said solvent substantially water-immiscible.

7. The method of claim 1, wherein said polymer is produced by solution polymerization in the presence of a catalyst.

8. The process of claim 7, wherein the catalyst is a Ziegler-type catalyst.

9. The method of claim 1, wherein the column has a length at least 5 times its diameter.

10. The method of claim 1, wherein the column has a length which is 10–250 times its diameter.

11. The method of claim 1, wherein the dispersion step is conducted at super-atmospheric pressure.

12. The method of claim 11, wherein the super-atmospheric pressure is between 2 and 8 atmospheres.

13. The method of claim 5, wherein the dispersion step is conducted at super-atmospheric pressure.

14. The method of claim 13, wherein the super-atmospheric pressure is between 2 and 8 atmospheres.

References Cited by the Examiner
UNITED STATES PATENTS 2,511,833   6/50   Beckel et al. _____ 159—14
3,014,849  12/61   Cottle _____ 202—46

JOSEPH L. SCHOFER, *Primary Examiner.*